United States Patent
Jia et al.

(10) Patent No.: US 11,216,699 B2
(45) Date of Patent: Jan. 4, 2022

(54) SYSTEM TO MITIGATE AGAINST ADVERSARIAL SAMPLES FOR ML AND AI MODELS

(71) Applicant: Baidu USA LLC, Sunnyvale, CA (US)

(72) Inventors: Yunhan Jia, Sunnyvale, CA (US);
Zhenyu Zhong, Sunnyvale, CA (US);
Yulong Zhang, Sunnyvale, CA (US);
Tao Wei, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 194 days.

(21) Appl. No.: 16/440,962

(22) Filed: Jun. 13, 2019

(65) Prior Publication Data
US 2020/0394466 A1    Dec. 17, 2020

(51) Int. Cl.
| | |
|---|---|
| *G06K 9/00* | (2006.01) |
| *G06K 9/62* | (2006.01) |
| *G06F 16/55* | (2019.01) |
| *G06F 16/535* | (2019.01) |

(52) U.S. Cl.
CPC ......... *G06K 9/6262* (2013.01); *G06F 16/535* (2019.01); *G06F 16/55* (2019.01); *G06K 9/6215* (2013.01)

(58) Field of Classification Search
CPC ........ G06N 20/00; G06N 3/08; G06N 3/0454; G06N 3/088; G06N 3/04; G06N 7/005; G06N 20/10; G06N 3/0445; G06N 3/0472; G06N 3/084; G06N 5/003; G06N 20/20; G06N 3/0481; G06N 3/082; G06N 7/00; G06N 3/006; G06N 3/02; G06N 3/063; G06N 3/086; G06N 5/046; G06N 10/00; G06N 3/00; G06N 3/049; G06N 3/06;

(Continued)

(56) References Cited

U.S. PATENT DOCUMENTS

2007/0019864 A1* 1/2007 Koyama ............... G06K 9/6203
                                                        382/218
2018/0299841 A1* 10/2018 Appu ................... G05B 13/027

FOREIGN PATENT DOCUMENTS

| EP | 3255565 A1 | 12/2017 | |
| JP | 2015191293 A | 11/2015 | |
| WO | WO-2019014487 A1 * | 1/2019 | ........... G06N 3/0454 |

OTHER PUBLICATIONS

Kathrin Grosse et al: "On the (Statistical) Detection of Adversarial Examples", arxiv.org, Cornell University Library, 201 Olin Library Cornell University Ithaca, NY 14853, Feb. 21, 2017 (Feb. 21, 2017), 13 pages.

(Continued)

*Primary Examiner* — Alex Kok S Liew
(74) *Attorney, Agent, or Firm* — Womble Bond Dickinson (US) LLP

(57) ABSTRACT

Embodiments of the disclosure disclose a system to mitigate against adversarial input samples for machine learning (ML)/artificial intelligence (AI) models. According to one embodiment, a system receives a query from a client for a ML service. The system calculates a similarity score for the query based on a number of prior queries received from the client, the similarity score representing a similarity between the received query and the prior queries. The system determines that the query is an adversarial query in response to determining that the similarity score is above a predetermined threshold.

17 Claims, 6 Drawing Sheets

(58) Field of Classification Search
CPC .......... G06N 3/10; G06N 3/126; G06N 5/025; G06N 5/04; G06N 5/041; G06N 5/045
See application file for complete search history.

(56) References Cited

OTHER PUBLICATIONS

Nicolas Papernot et al: "Practical Black-Box Attacks against Deep Learning Systems using Adversarial Examples", arxiv.org, Cornell University Library, 201 Olin Library Cornell University Ithaca, NY 14853, Feb. 8, 2016 (Feb. 8, 2016), 16 pages.

* cited by examiner

US 11,216,699 B2

SYSTEM TO MITIGATE AGAINST ADVERSARIAL SAMPLES FOR ML AND AI MODELS

TECHNICAL FIELD

Embodiments of the invention relate generally to secure multiparty computing. More particularly, embodiments of the invention relate to a system to mitigate against adversarial samples for machine learning (ML) and artificial intelligence (AI) models.

BACKGROUND

ML and/or AI models can be provided through cloud APIs by cloud providers, which can be used by applications to censor/filter content, and classify/detect malwares/threats. However, adversaries can send continuous queries to probe a "blind spot" of the ML or AI models to generate "adversarial samples" to fool the ML or AI models.

Manual inspections of the filtered content and detections can be performed by humans to identify adversarial samples. But this approach is time consuming and not scalable.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure disclose a method and a system to mitigate "adversarial samples" that exploit "blind spots" of machine learning or artificial intelligence (ML/AI) models. According to one embodiment, a system receives a query from a client for an ML service. The system calculates a similarity score for the query based on a number of prior queries received from the client, the similarity score representing a similarity between the received query and the prior queries. The system determines that the query is an adversarial query in response to determining that the similarity score is above a predetermined threshold.

Figure 1:
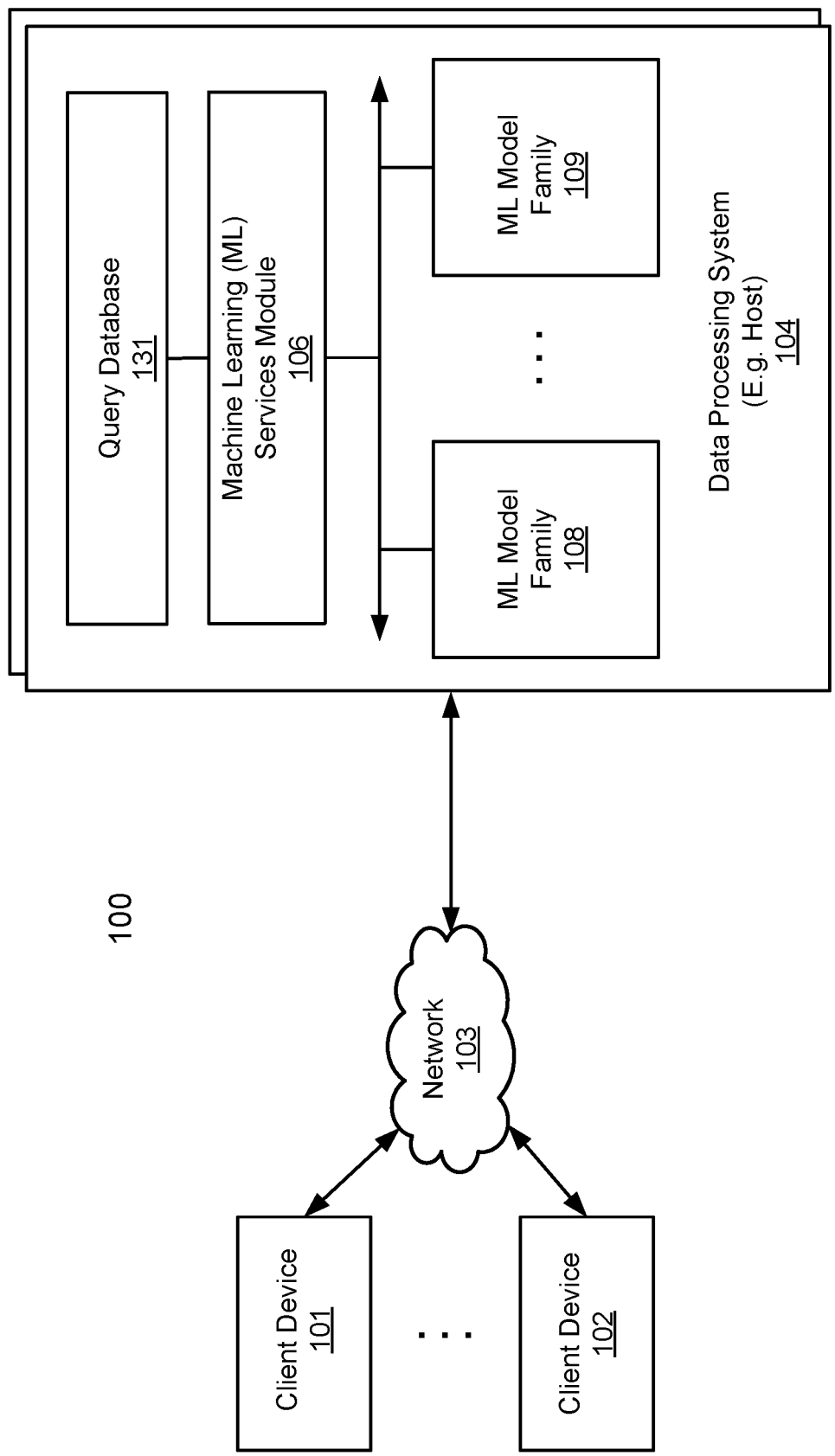
FIG. 1 is a block diagram illustrating a networked system according to one embodiment.

FIG. 1 is a block diagram illustrating a networked system according to one embodiment. Referring to FIG. 1, system configuration 100 includes, but is not limited to, one or more client devices 101-102 communicatively coupled to data processing server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless. The communication between client devices 101-102 and data processing server 104 over network 103 can be secured, e.g., via TLS/SSL.

Data processing server (e.g., host) 104 may be any kind of servers or a cluster of servers, such as Web or cloud servers, application servers, backend servers, or a combination thereof. Server 104 can include an interface to allow clients such as client devices 101-102 to access resources or services provided by server 104. Examples of resources or services can include cloud AI services for content censoring/filtering, malware/threat classification/detection. The services can be performed using, statistical, machine learning (ML)/artificial intelligence (AI) algorithms and models. Examples of ML/AI models can include single layered or deep neural network models such as recurrent, reinforcement learning, convolutional neural network models, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

Data processing server 104 can include query/input database 131 to store queries and/or input data sent by clients. Example of input data can include prior queries and input data for censoring/filtering and/or threat detection.

Data processing server 104 can include machine learning (ML) services module 106 and one or more ML model family 108-109. ML services module 106 can receive ML/AI services requests from clients 101-102 and return results to the requestor once the request has been fulfilled. ML model family 108-109 can include one or more families of ML models. The family of ML models can serve the same ML service but each returns a slightly different prediction score. In one embodiment, the family of ML models is trained together but with different training parameters so that each ML model in the family outputs a different prediction outcome or confidence score. Examples of different model/training parameters can include different epochs (number of passes through the training data), iterations to convergence, activation functions, dropout rate, (if the model is a neural network), etc. For example, in an offline training, the last three check points for an AI model (e.g., t=T, t=T−1, t=T−2) can be used as ML/AI models of a family. These trained models would generate slightly different output results (e.g., probability/confidence score) but have the same inference (e.g., classification/threat detection). For example, a content filtering query with the same input parameters (e.g., classifying if an image has obscene/explicit material) can have three distinct outputs prediction (such as 0.90, 0.91, and 0.906) using the three ML models of the family, but result in the same inference (the image has obscene/explicit material). In one embodiment, each family of ML models can designate a target ML model to service a request. In another embodiment, a model in each family is randomly selected to service a request. In this case, the content filtering can identify obscene/explicit materials, malware/threat detection, or any other type of content in the input data but with a different confidence score each time.

Figure 2:
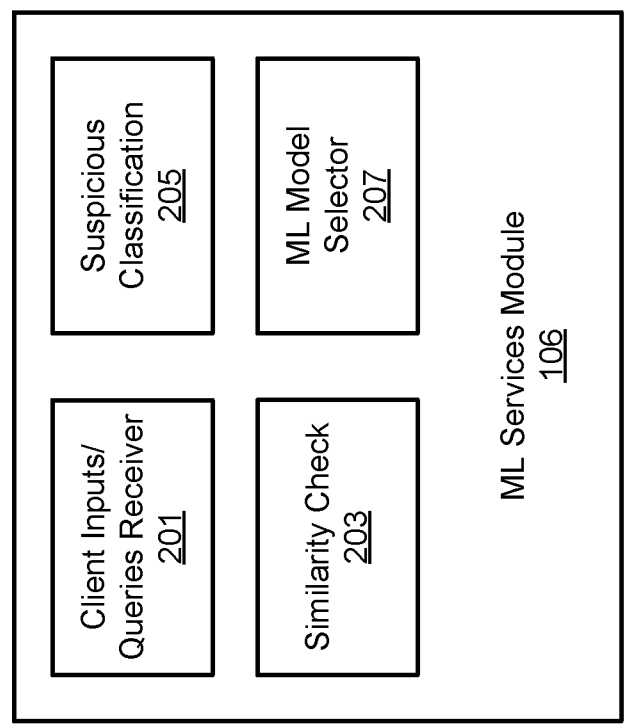
FIG. 2 is a block diagram illustrating an example of a ML services module according to one embodiment.

FIG. 2 is a block diagram illustrating an example of a ML services module according to one embodiment. ML services module 106 can generate an obfuscated confidence score for a client input for an ML/AI service. Referring to FIG. 2, in one embodiment, ML services module 106 includes submodules such as client inputs/queries receiver 201, similarity check 203, suspicious classification 205, and ML model selector 207. Client inputs/queries receiver 201 can receive client queries and/or client inputs associated with a client request. Client inputs/queries receiver 201 can further store the received information in a query/input database, such as query/input database 131 of FIG. 1, for later retrieval. Similarity check 203 can generate a similarity score for a client input in comparison with a prior client input. Suspicious classification 205 can determine if a client input is suspicious/adversarial based on a similarity score for the client input. ML model selector 207 can select a ML model within a ML models family to service a client query. In one embodiment, the ML model is randomly selected from the ML model family using a random function.

Figure 3:
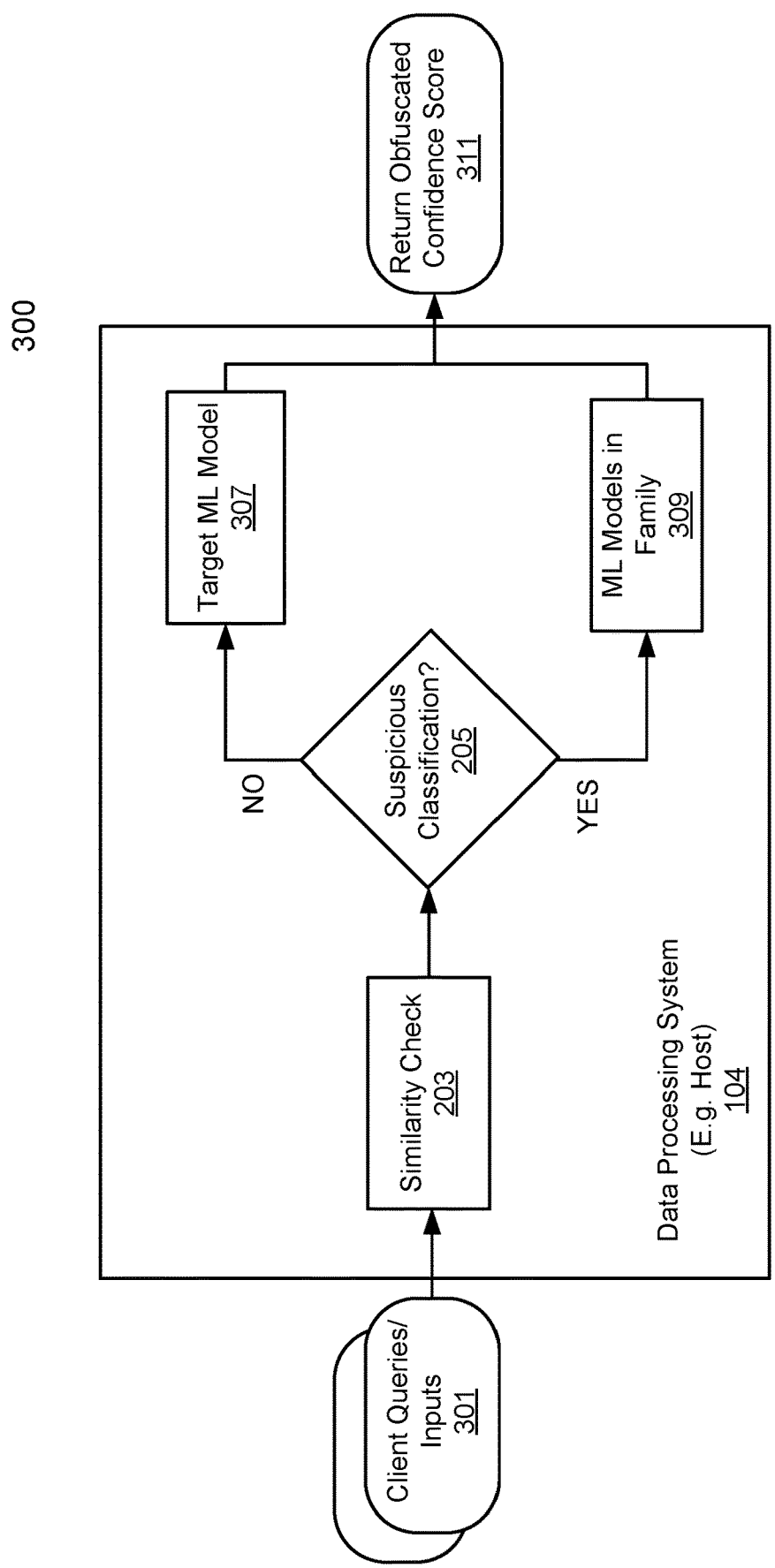
FIG. 3 is a block diagram illustrating a system providing ML services according to one embodiment.

FIG. 3 is a block diagram illustrating a system providing ML services according to one embodiment. System 300 may represent system 100 of FIG. 1. Referring to FIG. 3, host 104 can receive client queries and/or input(s) 301 and return an obfuscated confidence score 311 to the requesting client. Client inputs can come from a program or application (app) that uses the cloud AI service. For example, an app can use image censorship AI service provided by system 300 to detect and censor potential adult, obscene, or violent material in the image.

Referring to FIG. 3, in one embodiment, the received client inputs are passes through similarity check 203. Input similarity check 203 can generate a similarity score indicating how 'similar' the input in the query is compared with previous inputs of the same client. In another embodiment, input similarity check 203 generates a similarity score for the input\ in the query in comparison with previous inputs of all clients within a predetermined time span. The motivation is that in order to generate "adversarial samples", an attacker needs to probe the AI models with a set of inputs each with a slightly different perturbation. The output confidence scores for each of these inputs with the slight variation can be used to probe and estimate gradient information of the ML model. Based on the estimated gradient information, the attacker can craft adversarial samples that reliably decrease the model output confidence scores, which increases the likelihood that adversarial samples would fool the AI models. With an obfuscated confidence score, it would be much harder for an attacker to estimate the gradient information and to find a direction of perturbation to decrease the model confidence score, since the confidence score is generated by randomly selected ML models of a ML model family.

Generation of similarity scores can be implemented in various ways for different applications/client inputs. For example, in one embodiment, the similarity score can be implemented as a distance score between an input (e.g., x) and a prior input (e.g., x'). In one embodiment, for input images, the distance score can be a combination of L0, L1, and L2, where L0 is calculated based on a count of the number of different pixels between x and x', L1 is the sum of differences (e.g., x–x') for all pixels, and L2 is the root mean square of differences (e.g., sqrt $(x^2-x'^2)$) for all pixels.

Based on the similarity score, suspicious classification 205 can classify the client input data to be suspicious if the similarity score is above a predetermined threshold score, or classify the client input data as normal if the similarity score is lower than or equal to the predetermined threshold score.

If the input is classified as normal, a target ML/AI model 207 can be selected to perform the prediction task based on the client input. If the input is classified as suspicious, a ML/AI model can be randomly selected from a collection of ML/AI models that are trained together with the target ML/AI model but with slightly different parameters (e.g., ML models family 209), to perform the prediction task based on the client input. Note that the purpose is to have alternate models that does not differ much from the target model in terms of prediction accuracy and yet yields the same inference results. The different prediction accuracy for the prediction task can generates an obfuscated confidence score 211. Note, here the obfuscation confidence scores refer to varying probability/confidence scores when the same input sample is used as client inputs, where the differences in the confidence scores do not provide a clear pattern for adversarial input probing. The obfuscated confidence score then deters adversarial probing using adversarial samples. Note that ML/AI models can have "blind spots" (resulting in an incorrect inference) due to various reasons such as overfitting, inadequate dataset during training or a shortcoming of the AI models. The "blind spots" allow adversaries to probe the AI model for a trend so to reliably craft input samples that triggers the "blind spots".

Figure 4:
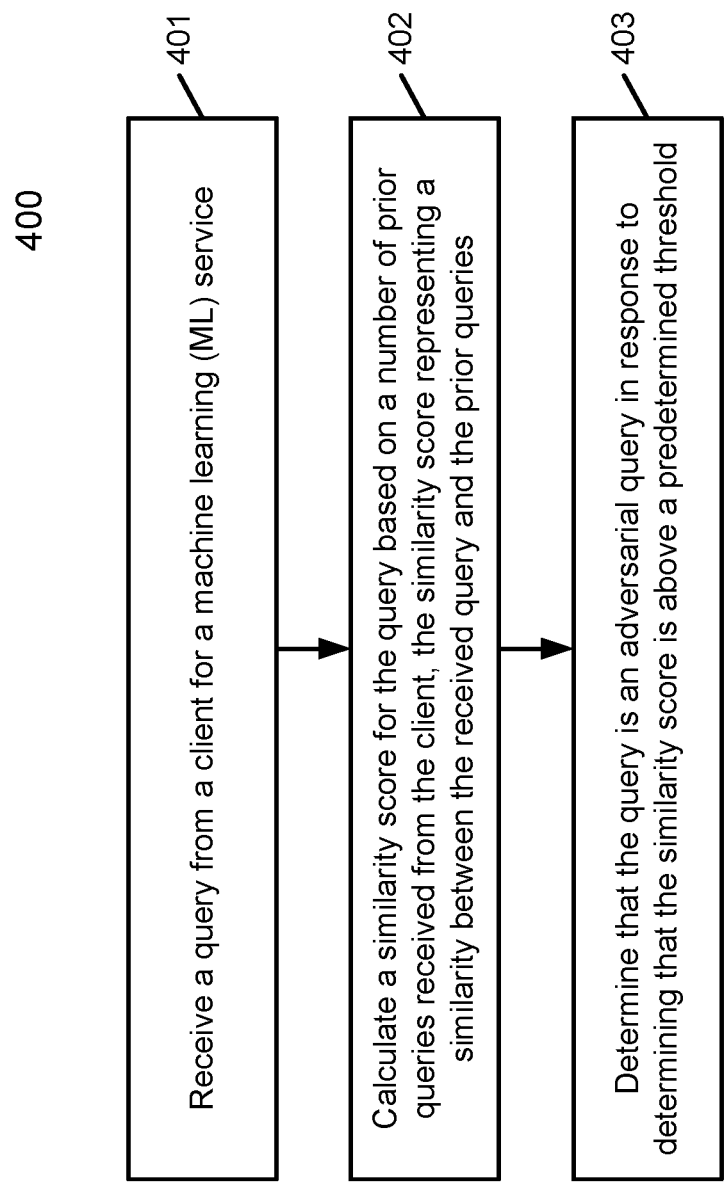
FIG. 4 is a flow diagram illustrating a method according to one embodiment.

FIG. 4 is a flow diagram illustrating a method according to one embodiment. Process 400 may be performed by processing logic which may include software, hardware, or a combination thereof. For example, process 400 may be performed by data processing server (e.g., host) 104 of FIG. 1. Referring to FIG. 4, at block 401, processing logic receive a query from a client for a machine learning (ML) service. At block 402, processing logic calculates a similarity score for the query based on a number of prior queries received from the client, the similarity score representing a similarity between the received query and the prior queries. At block 403, processing logic determines that the query is an adversarial query in response to determining that the similarity score is above a predetermined threshold.

Figure 5:
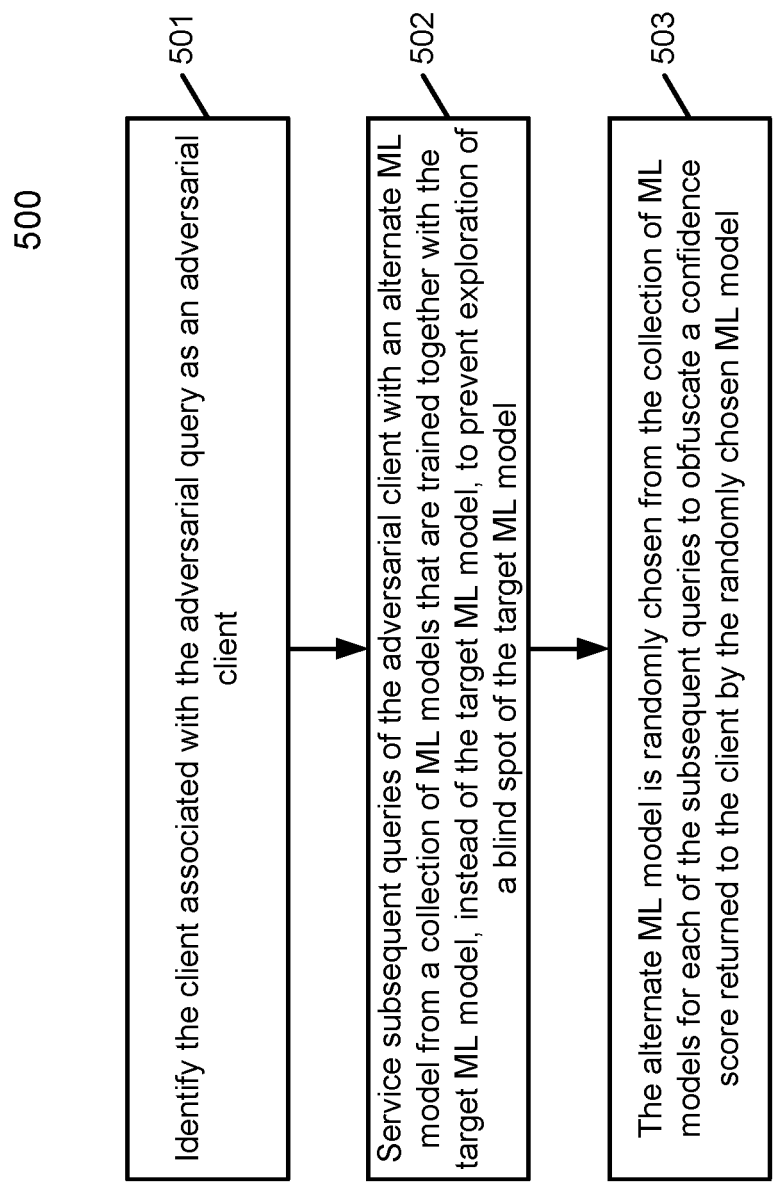
FIG. 5 is a flow diagram illustrating a method according to one embodiment.

FIG. 5 is a flow diagram illustrating a method according to one embodiment. Process 500 may be performed by processing logic which may include software, hardware, or a combination thereof. For example, process 500 may be performed by data processing server (e.g., host) 104 of FIG. 1. Referring to FIG. 5, at block 501, processing logic identifies the client associated with the adversarial query as an adversarial client. At block 502, processing logic services subsequent queries of the adversarial client with an alternate ML model from a collection of ML models that are trained together with the target ML model, instead of the target ML model, to prevent exploration of a blind spot of the target ML model. At block 503, the alternate ML model is randomly chosen from the collection of ML models for each of the subsequent queries to obfuscate a confidence score returned to the client by the randomly chosen ML model.

In one embodiment, processing logic further blocks additional queries from the adversarial client. In another embodiment, the collection of ML models is trained together with the target ML model with a different parameter including a different epoch.

In one embodiment, the similarity score is calculated based on a distance between any two inputs for any two queries. In another embodiment, if the two inputs are images, the distance includes a count of different pixels between the two images. In another embodiment, the distance includes a sum of differences in pixels between the two images. In another embodiment, the distance includes a root mean square of differences in pixels between the two images.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
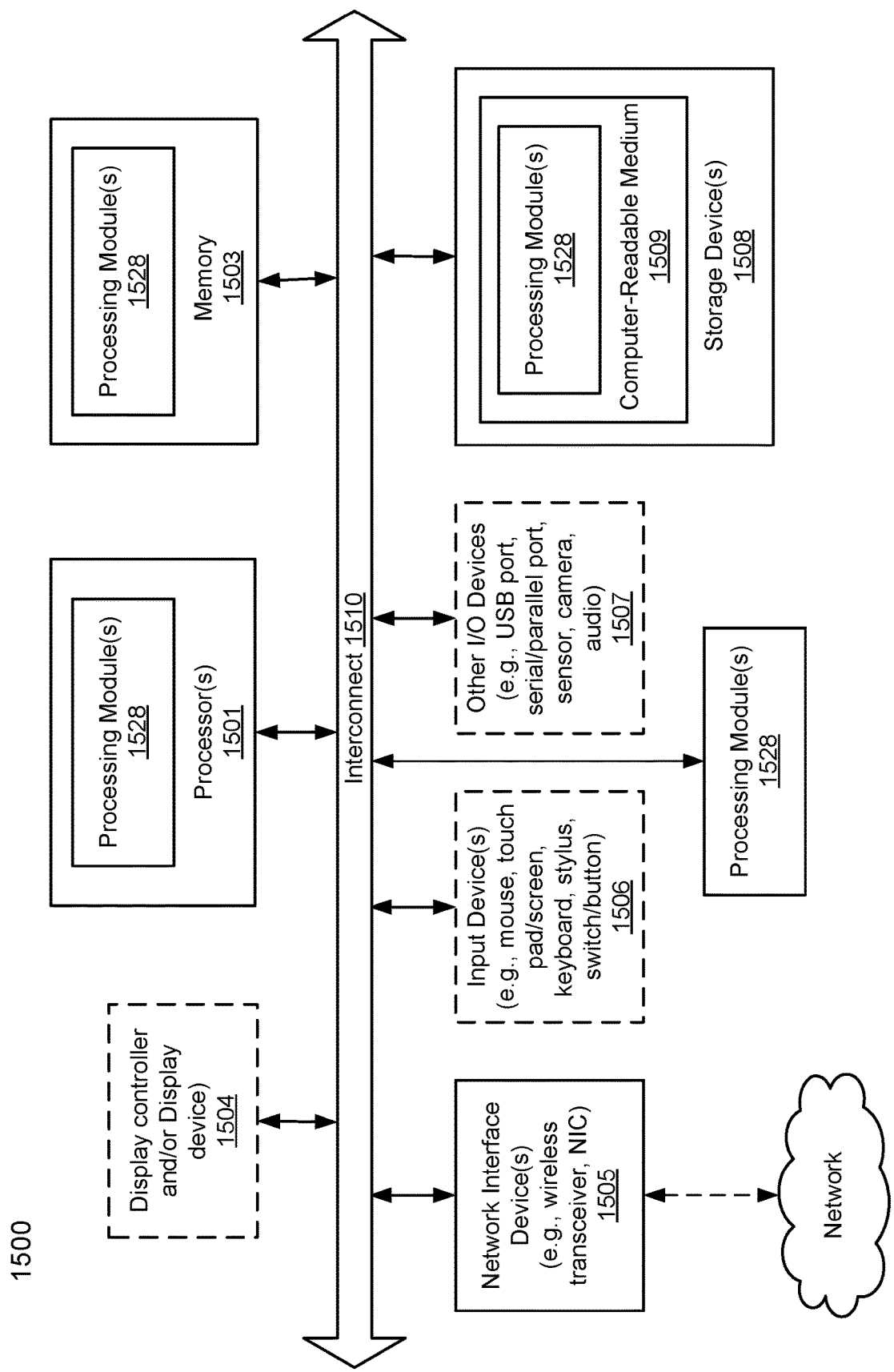
FIG. 6 is a block diagram illustrating a data processing system according to one embodiment.

FIG. 6 is a block diagram illustrating an example of a data processing system which may be used with one embodiment of the invention. For example, system 1500 may represent any of data processing systems described above performing any of the processes or methods described above, such as, for example, a client device or a server described above, such as, for example, clients 101-102, and server 104, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, ML service module 106 or host server 104 of FIG. 1. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing data in a trusted environment, the method comprising:
   receiving a query from a client for a machine learning (ML) service to be served by a target ML model;
   calculating a similarity score for the query based on a plurality of queries previously received from the client, the similarity score representing a similarity between the received query and prior queries;
   determining whether the similarity score is above a predetermine threshold;
   determining that the query is an adversarial query in response to determining that the similarity score is above a predetermined threshold;
   designating the client associated with the adversarial query as an adversarial client, in response to determining that the query is an adversarial query; and
   servicing subsequent queries of the adversarial client with an alternate ML model from a collection of ML models that have been trained together with the target ML model, instead of the target ML model, to prevent exploration of a blind spot of the target ML model.

2. The method of claim 1, further comprising blocking additional queries from the adversarial client.

3. The method of claim 1, wherein the alternate ML model is randomly chosen from the collection of ML models for each of the subsequent queries to obfuscate a confidence score returned to the client by the randomly chosen ML model.

4. The method of claim 1, wherein the collection of ML models were trained together with the target ML model but with a different parameter including a different epoch.

5. The method of claim 1, wherein the similarity score is calculated based on a distance between any two inputs for any two queries.

6. The method of claim 5, wherein, if the two inputs are images, the distance includes a count of different pixels between the two images.

7. The method of claim 5, wherein, if the two inputs are images, the distance includes a sum of differences in pixels between the two images.

8. The method of claim 5, wherein, if the two inputs comprise two images, the distance includes a root mean square of differences in pixels between the two images.

9. A non-transitory machine-readable medium having instructions stored therein, which when executed by a processor, cause the processor to perform operations, the operations comprising:
   receiving a query from a client for a machine learning (ML) service to be served by a target ML model;
   calculating a similarity score for the query based on a plurality of queries previously received from the client, the similarity score representing a similarity between the received query and prior queries;
   determining whether the similarity score is above a predetermine threshold;
   determining that the query is an adversarial query in response to determining that the similarity score is above a predetermined threshold;
   designating the client associated with the adversarial query as an adversarial client, in response to determining that the query is an adversarial query; and
   servicing subsequent queries of the adversarial client with an alternate ML model from a collection of ML models that are trained together with the target ML model, instead of the target ML model, to prevent exploration of a blind spot of the target ML model.

10. The non-transitory machine-readable medium of claim 9, wherein the operations further comprising blocking additional queries from the adversarial client.

11. The non-transitory machine-readable medium of claim 9, wherein the alternate ML model is randomly chosen from the collection of ML models for each of the subsequent queries to obfuscate a confidence score returned to the client by the randomly chosen ML model.

12. The non-transitory machine-readable medium of claim 9, wherein the collection of ML models is trained together with the target ML model but with a different parameter including a different epoch.

13. The non-transitory machine-readable medium of claim 9, wherein the similarity score is calculated based on a distance between any two inputs for any two queries.

14. A data processing system, comprising:
   a processor; and
   a memory coupled to the processor to store instructions, which when executed by the processor, cause the processor to perform operations, the operations including
   receiving a query from a client for a machine learning (ML) service to be served by a target ML model,
   calculating a similarity score for the query based on a plurality of queries previously received from the client, the similarity score representing a similarity between the received query and prior queries,
   determining whether the similarity score is above a predetermine threshold,
   determining that the query is an adversarial query in response to determining that the similarity score is above a predetermined threshold,
   designating the client associated with the adversarial query as an adversarial client, in response to determining that the query is an adversarial query, and
   servicing subsequent queries of the adversarial client with an alternate ML model from a collection of ML models that are trained together with the target ML model, instead of the target ML model, to prevent exploration of a blind spot of the target ML model.

15. The system of claim 14, wherein the operations further comprising blocking additional queries from the adversarial client.

16. The system of claim 14, wherein the alternate ML model is randomly chosen from the collection of ML models for each of the subsequent queries to obfuscate a confidence score returned to the client by the randomly chosen ML model.

17. The system of claim 14, wherein the collection of ML models is trained together with the target ML model but with a different parameter including a different epoch.

* * * * *